United States Patent [19]

Rutz

[11] Patent Number: 5,310,987
[45] Date of Patent: May 10, 1994

[54] ELECTRON BEAM GUN CONNECTOR

[75] Inventor: Robert E. Rutz, Orinda, Calif.

[73] Assignee: RPC Industries

[21] Appl. No.: 981,552

[22] Filed: Nov. 25, 1992

[51] Int. Cl.⁵ .................................................. B23K 15/00
[52] U.S. Cl. .................................................. 219/121.34
[58] Field of Search ................. 219/121.34, 121.35; 250/492.1, 492.3

[56] References Cited

U.S. PATENT DOCUMENTS

| | | | |
|---|---|---|---|
| 3,286,021 | 11/1966 | Koch | 174/80 |
| 3,716,652 | 2/1973 | Lusk et al. | 174/15 R |
| 4,007,375 | 2/1977 | Albert | 250/404 |
| 4,329,665 | 5/1982 | Kawai et al. | 333/182 |
| 4,344,126 | 8/1982 | Schumacher | 363/126 |
| 4,367,412 | 1/1983 | Cheever | 250/492.3 |
| 4,389,573 | 6/1983 | Itoh | 250/492.2 |
| 4,525,652 | 6/1985 | Sperzel et al. | 315/307 |
| 4,574,178 | 3/1986 | Spruck | 219/121.34 |
| 4,677,411 | 6/1987 | Hofmann et al. | 336/60 |
| 5,150,067 | 9/1992 | McMillan | 328/64 |

Primary Examiner—C. L. Albritton
Attorney, Agent, or Firm—Malcolm B. Wittenberg

[57] ABSTRACT

In a high power hot cathode electron beam gun with a cathode and cathode heater which are caused to float at high potential, a high voltage cable termination is provided with built-in transformer. The transformer is characterized as having an input impedance matched to the cable and output impedance matched to the cathode heater. Using this configuration, the cathode power supplies and cathode/heater control assembly can be located in remote locations.

4 Claims, 1 Drawing Sheet

U.S. Patent     May 10, 1994     5,310,987

# ELECTRON BEAM GUN CONNECTOR

TECHNICAL FIELD OF THE INVENTION

The present invention relates to the coupling of a high voltage power supply to an electron beam cathode and its corresponding cathode heater. The use of a toroidal step-down transformer and its placement adjacent the cathode heater at the end of a DC power supply cable is of primary interest.

BACKGROUND OF THE INVENTION

The present invention relates to an apparatus for irradiating material by an electron beam. Such apparatus is useful in a number of diverse areas such as for the sterilization of food products, the polymerization of monomers and for genetic purposes such as for the irradiation of seeds and insects. Although such devices are extremely useful, the high currents and high voltages which are employed in providing an appropriate electron beam of suitable intensity has generally mandated the providing of multiple enclosures some of which are placed under either high vacuum and/or high gas pressure. Logistically, these various enclosures occupy surprisingly large volumes which makes the implementation of electron beam irradiators cumbersome at best.

FIG. 1 typifies prior art electron beam irradiation sources and their supporting power supplies. Specifically, an enclosure 10 for a high voltage power supply 11 is provided having high voltage cable connectors 1 connecting enclosure 10 to enclosure 20 via a single conductor high voltage cable 12. Enclosure 20 which is generally provided at high gas pressure is again a high voltage enclosure for electron beam gun control elements 2 and a high voltage isolation transformer 3 for the cathode heater 5 and auxiliary power for control elements 2. High gas pressure enclosure 20 is connected to an electron beam gun vacuum chamber 30 via gas to vacuum high voltage bushing 4. Each of these elements are well known to those skilled in this art.

The high power hot cathode electron beam gun's cathode heater 5 housed in enclosure 30 requires a high current, in the order of at least 100 amps, from its power source. It has been universally recognized that this source must be located close to the electron beam gun because the high voltage cable, to which the cathode is connected, cannot carry such high currents. The cathode is floating at a very high potential, typically 200–300 kV, and, therefore, the heater current source is also floating at the same high voltage. As noted by reference to FIG. 1, in a conventional design, the current source is contained in a special tank or enclosure 20 located between the gun end of the high voltage cable and the gun itself. This tank being at least approximately the same size as the gun enclosure, is expensive and occupies a large space in the electron beam processor production area.

It is thus an object of the present invention to provide an electron beam gun assembly which, by virtue of its design, is capable of eliminating the special tank between the gun end of a high voltage cable and the gun itself.

It is yet another object of the present invention to provide a high voltage cable termination with built-in current matching transformer which would provide for the complete elimination of a high voltage tank assembly and high voltage bushing.

These and further objects will be more readily appreciated when considering the following disclosure and appended drawings wherein FIG. 1 represents a typical prior art configuration;

FIG. 2 represents a schematic depiction of the design of the present invention; and FIG. 3 is detailed cross-sectional view of the inventive cable termination.

SUMMARY OF THE INVENTION

The present invention deals with a high power hot cathode electron beam gun assembly which includes a cathode heater and high voltage power supply. The electron beam control elements and high voltage isolation transformer to power the cathode heater are provided in one location while the electron beam housing supports a termination for a high voltage cable having a built-in current matching transformer in another location. The transformer is located proximate to the hot cathode having an input impedance matched to the cable and an output impedance matched to the cathode heater.

DETAILED DESCRIPTION OF THE INVENTION

Figure 1:
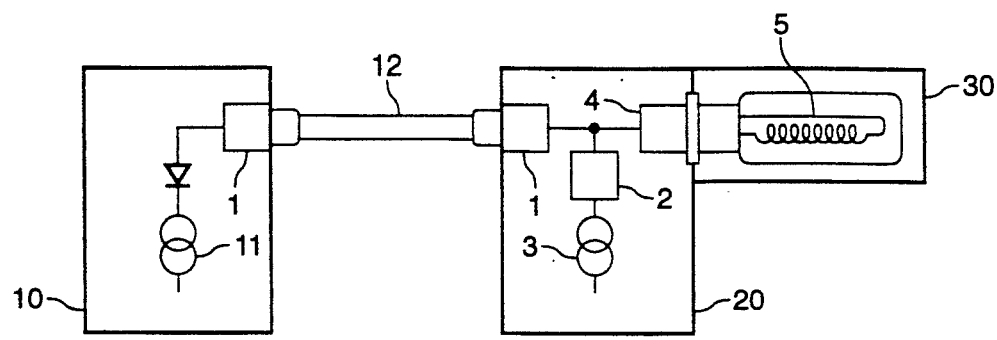
Figure 2:
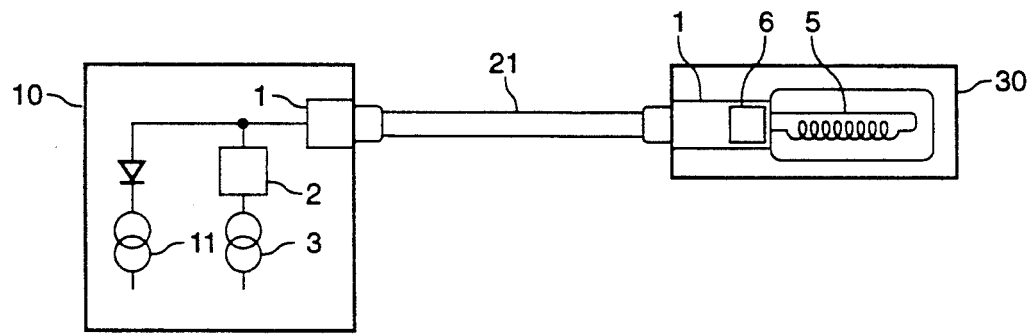

The present invention can be most readily appreciated in comparing the diagrammatic views of FIGS. 1 and 2. Unlike FIG. 1, FIG. 2 shows a three-conductor high voltage cable 21 terminated in a bushing having a built-in current matching transformer depicted as elements 5 and 6. The transformer is provided with an input impedance matched to cable 21, that is, high voltage/low current and an output impedance matched to the cathode heater, that is, low voltage/high current.

In providing the arrangement shown in FIG. 2, the high voltage enclosure tank assembly 20 and high voltage bushing 4 of FIG. 1 is completely eliminated by moving gun control elements 2 and isolation transformer 3 into high voltage power supply enclosure 10 which is a large insulating fluid filled tank that can easily accommodate these additional items.

Figure 3:
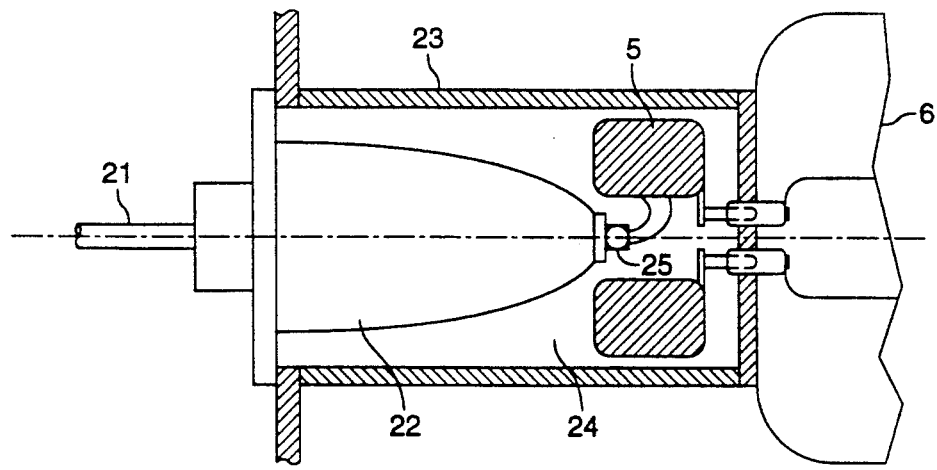

In practicing the present invention certain key advantages are readily evidenced. First, it is noted that electron beam gun housing 30 can be separated from high voltage power supply housing 10 by up to several hundred feet of high voltage cable 21. As such, high voltage power supply housing 10 can be completely removed from a production area in which irradiation employing the subject electron beam is being carried out. Furthermore, the elimination of high voltage enclosure 20 simply reduces the cost of fabrication by obviating the need for this additional assembly Obviously, the heart of the present invention is in the novel cable termination depicted diagrammatically in FIG. 2 as elements 5 and 6 located within electron beam gun housing 30. This termination is shown in greater detail in FIG. 3.

Specifically, cable termination 22 is of conventional design employing, for example, an epoxy molding. A ceramic envelope 23 is provided for preferably enclosing an insulating gas or fluid filling within internal space 24.

Provided at the high voltage cable termination of cable 21 through connector 25 is transformer 5 located within an extension of the already existing enclosure 23. This transformer is provided with an input impedance matched to said cable and an output impedance matched to said cathode heater 6. Additionally, due to its toroidal design, the transformer provides the additional benefit of acting as a corona shield when employed in such a high voltage environment. It is noted that the cathode 6 and cathode heater 5 generally float at approximately 200-300 kV.

By practicing the present invention, one is able to transmit, in an efficient manner, over cable 21, high voltage and cathode heater power to its point of use by electron beam gun 6 and heater 5. High voltages can be efficiently transmitted over cable 21 over relatively long distances. At the connector, transformer 5 steps down the voltage and proportionately increases the amperage for the electron beam gun cathode heater. Transformer 5 acting as a corona shield is yet a further benefit thus eliminating the need for separate shielding means as employed in competitive designs.

I claim:

1. In a high power hot cathode electron beam gun wherein said cathode and cathode heater are caused to float at high potential, the improvement comprising providing a high voltage cable termination with built in transformer, said transformer having an input impedance matched to said cable and an output impedance matched to said cathode heater.

2. The high power hot cathode electron beam gun of claim 1 wherein said cathode and cathode heater float at approximately 200-300 kV.

3. The high power hot cathode electron beam gun of claim 1 wherein said transformer acts as a corona shield.

4. In a high power hot cathode electron beam gun assembly comprising a cathode heater and high voltage power supply, electron beam control elements, high voltage isolation transformer to power a cathode heater and current matching transformer, the improvement comprising housing said electron beam control elements, isolation transformer and high voltage power supply in an enclosure located remotely from said hot cathode and cathode heater wherein said enclosure is functionally connected to said hot cathode and cathode heater by means of a high voltage cable having a high voltage termination with built in transformer, said transformer being located proximate said hot cathode and having an input impedance matched to said cable and an output impedance matched to said cathode heater.

* * * * *